United States Patent [19]
Chen et al.

[11] Patent Number: 5,282,081
[45] Date of Patent: Jan. 25, 1994

[54] DUAL REFLECTING TYPE AND TRANSMITTING TYPE SCANNER

[75] Inventors: Eric Chen; Alan Liu; Chih-Hong Hsu, all of Hsin-Chu, Taiwan

[73] Assignee: Must Systems, Inc., Hsin-Chu, Taiwan

[21] Appl. No.: 932,371

[22] Filed: Aug. 19, 1992

[51] Int. Cl.⁵ .............................. G02B 26/08
[52] U.S. Cl. .................. 359/223; 359/896; 358/474; 250/578.1; 235/470
[58] Field of Search ............ 359/196, 214, 205, 896, 359/204, 223; 250/578.1; 235/470, 472; 358/474, 494

[56] References Cited

U.S. PATENT DOCUMENTS 4,349,843 9/1982 Laakman ..................... 358/206
4,873,579 10/1989 Kubota et al. ............... 358/471
4,930,848 6/1990 Knowles ...................... 359/214
5,038,227 8/1991 Koshiyouji et al. ........... 358/471

*Primary Examiner*—Rodney B. Bovernick
*Assistant Examiner*—James Phan
*Attorney, Agent, or Firm*—W. Wayne Liauh

[57] ABSTRACT

A reflection-transparence scanner comprises a reflection type scanner and a scanner converter which converts reflection type scanner as transparence type scanner, the scanner converter comprises: a casing, having a flat upper surface equipped with a scanning window; a light source, fixed to the casing; a power supply, to provide the electricity to the light source; and a light transmitter, fixed to the scanning window of the casing, and used to evenly distribute over a plane the light emitted by the light source.

1 Claim, 10 Drawing Sheets

DUAL REFLECTING TYPE AND TRANSMITTING TYPE SCANNER

BACKGROUND OF THE INVENTION

1. Field of the Invention

This invention relates to a reflection type scanner to transparence type scanner converter, especially to a converter enabling a reflective image scanner to be used as a transparence type image scanner.

2. Description of the Prior Art

The image scanner is a useful input device for the computer system to input images into it. Conventional scanners are separated into two groups: the reflection type scanners and the transparence type scanners. FIG. 1 is a light path diagram of a standard reflection type hand-held scanner. The diagram also shows the general structure of a reflection type scanner in which 1 is a lamp, 2 is a reflecting mirror, 3 is a lens, 4 is an image sensor (such as a charge coupled device, CCD), and 5 is a casing.

The light emitted by the lamp 1 is directed toward the document D placed on the platform, and then reflected off the reflecting mirror 2 to the lens 3. After undergoing idiotic image formation, the light enters the light sensor 4. Since the image component of the document is loaded onto the light during reflection, the image sensor can convert the image component into electrical voltage for input to a computer system (not shown) for processing.

FIG. 2 is a light path diagram of a standard transparence type hand-held scanner. The diagram shows the general structure of the transparence type scanner. Those members of the diagram also appearing in FIG. 1 are labeled with the same numbers. As can be seen in the diagram, the light emitted by the lamp 1 passes through a collimator 6 to the document D. The document D is translucent (typically plastic image recording media, such as negatives or slides). Light from the lamp 1 that reaches the document D passes through the document D and picks up the image component of the document D. The light then continues on to the reflecting mirror 2 to be reflected to the lens 3, and then after undergoing idiotic image formation, enters the image sensor 4. The image sensor 4 then converts the image component of the document D into electricity to be input to the computer system (not shown) for processing.

Transparence type and reflection type scanners are different in structure and are used with image recording media of differing natures. Reflection type scanners are typically suited to media with relatively high reflectivity, such as paper, film, etc. Transparence type scanners, on the other hand, are suited for use with media made from materials with relatively high transparence, such as the above-mentioned negatives and slides, or projection film. Users who require the use of both types of media thus have to purchase two types of scanners. Users, however, for reasons of utility and economics, prefer not having to purchase one each of the above-mentioned types of scanners when different media materials have to be scanned.

Thus the provision of a dual-function reflection-transparence scanner has become a matter of concern in the industry. Also, the recording media suited for use with transparence type scanners typically has special specifications and is made of special materials, which makes manufacture of these devices relatively complex. Simplification of these devices is thus a current task of the industry.

It is thus an object of the present invention to provide a reflection-transparence scanner converter which can endow a reflection type scanner with transparence type scanner capabilities.

Another object of the present invention is to provide a scanner that combines the functions of reflection and transparence type scanning.

Another object of the present invention is to provide a simplified transparence type scanner.

BRIEF DESCRIPTION OF THE INVENTION

It has been found that, by using a converter comprising: a casing, having a flat upper surface equipped with a scanning window; a light source; a power supply; and a light transmitter, fixed to said scanning window of the casing, and used to evenly distribute over a plane the light emitted by said light source, a reflection type scanner may be provided with transparence type scanner capability.

The above and other objects, features and advantages of the invention will be apparent from the following more particular description of preferred embodiments thereof as illustrated in the accompanying drawings.

DESCRIPTION OF THE PREFERRED EMBODIMENTS

Embodiment 1

Figure 1:
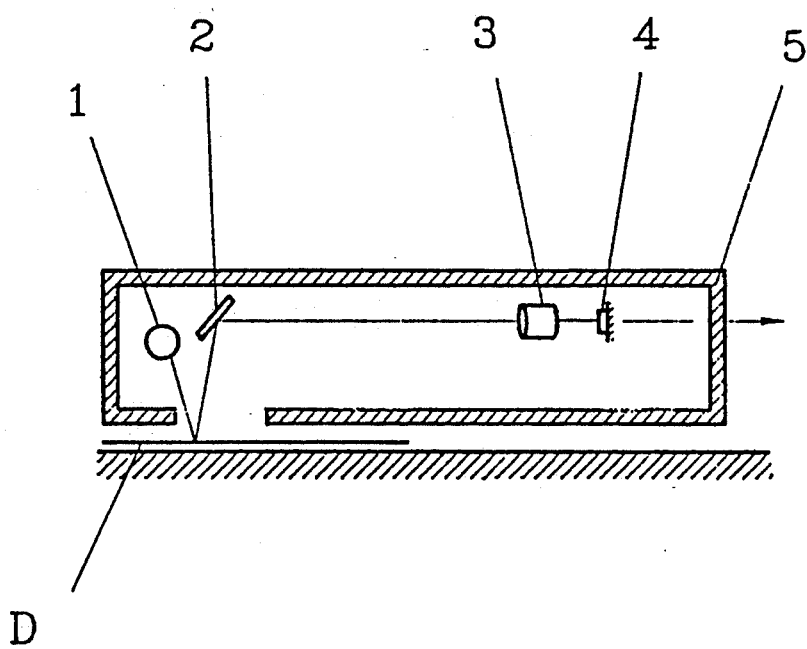
FIG. 1 is a light path diagram of a standard reflection type scanner.
Figure 2:
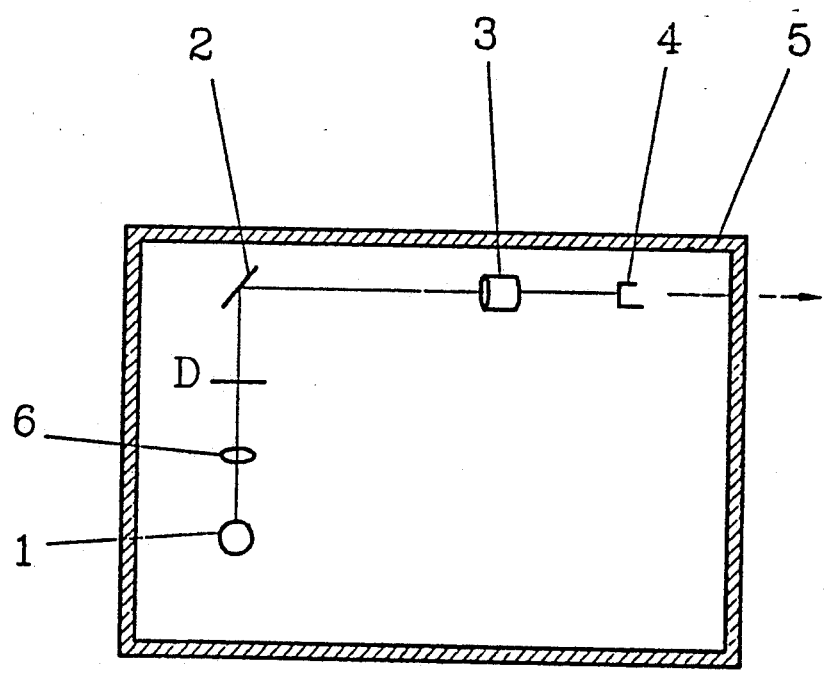
FIG. 2 is a light path diagram of a standard transparence type scanner.
Figure 3:
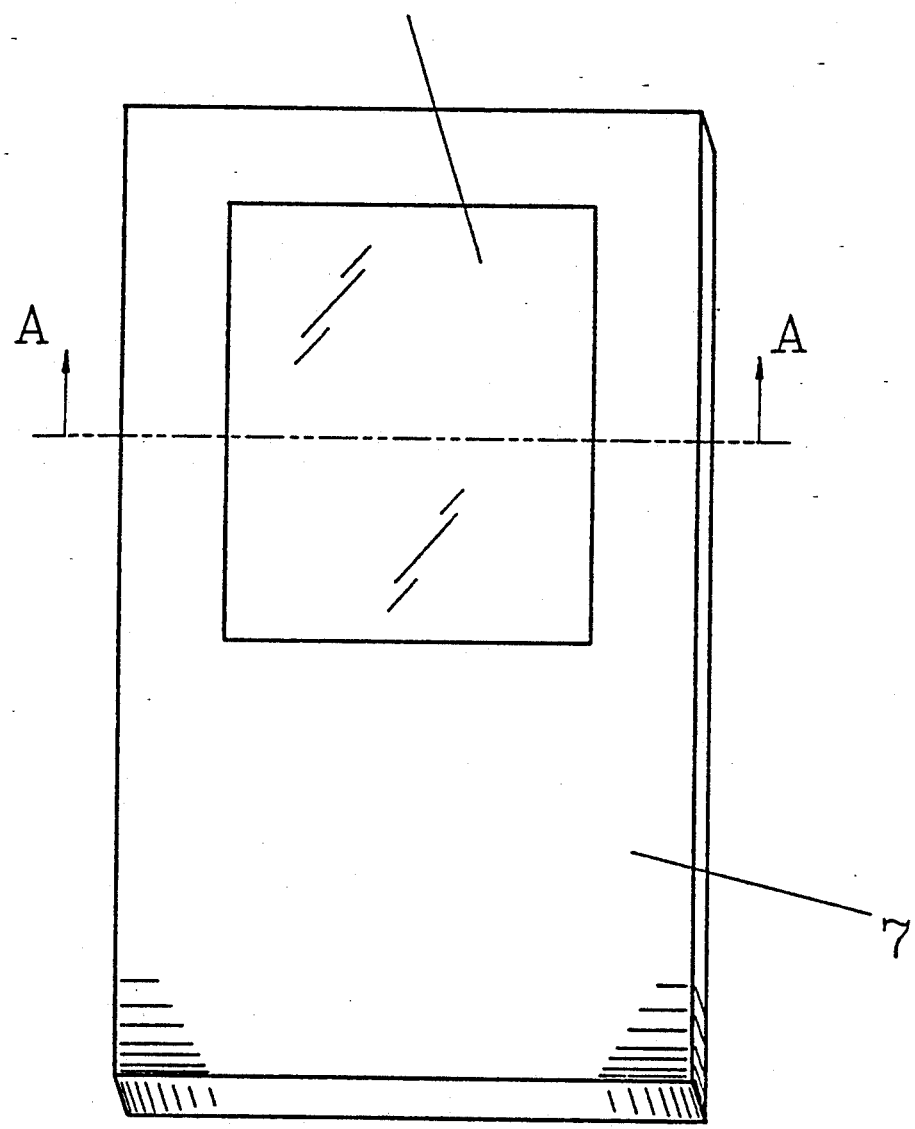
FIG. 3 is an plane view of a preferred embodiment of the reflection type scanner to transparence type scanner converter of the invention.
Figure 4:
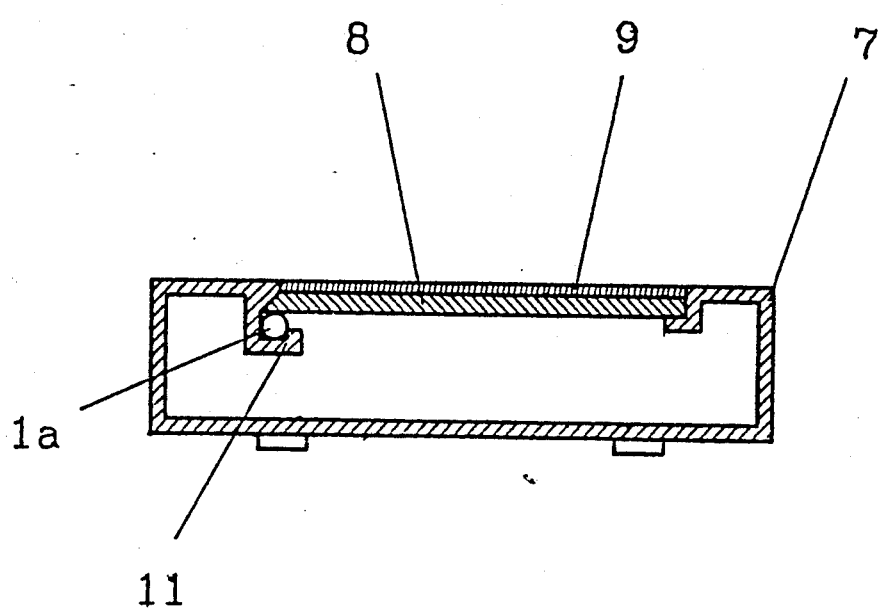
FIG. 4 is a cross section of FIG. 3 along line A—A.

Referring now to FIG. 3 which is an external plane view of an embodiment of the scanner converter of the invention, and FIG. 4 is a cross section of FIG. 3 along line A—A. In the figures, 1a is the lamp, which is typically a fluorescent light for use in scanners. 7 is the casing for the converter, the upper surface of which is installed with a scanning window. The lamp 1a is secured to the casing 7 using a fixing device 11. The scanning window in this embodiment uses a smooth-surfaced light transmitter 8 covered with a protective layer 9. The material used for the light transmitter 8 is preferably made of polycarbonate resin, which is readily available on the market. This material has superior light conducting properties and, in addition to minimizing light scattering, can evenly distribute the light emitted from the lamp 1a over all sectors of the light transmitter 8 such that deviation is kept to within 3%. In this embodiment, although the lamp 1a is secured to one end of the light transmitter 8, the proportional difference between the intensity of the light emitted toward the protective layer 9 from the lamp end of the light transmitter 8 and the intensity of light emitted from the other end of the light transmitter 8 can be controlled to within 3%.

The protective layer 9 is an abrasion resistant material of superior light transmissivity, and is ideally made of glass. In the present embodiment, the edges of the light transmitter 8 and the protective layer 9 form an angle on the side next to the lamp 1a. This design assists in the even distribution of the light over the light transmitter 8.

Figure 5:
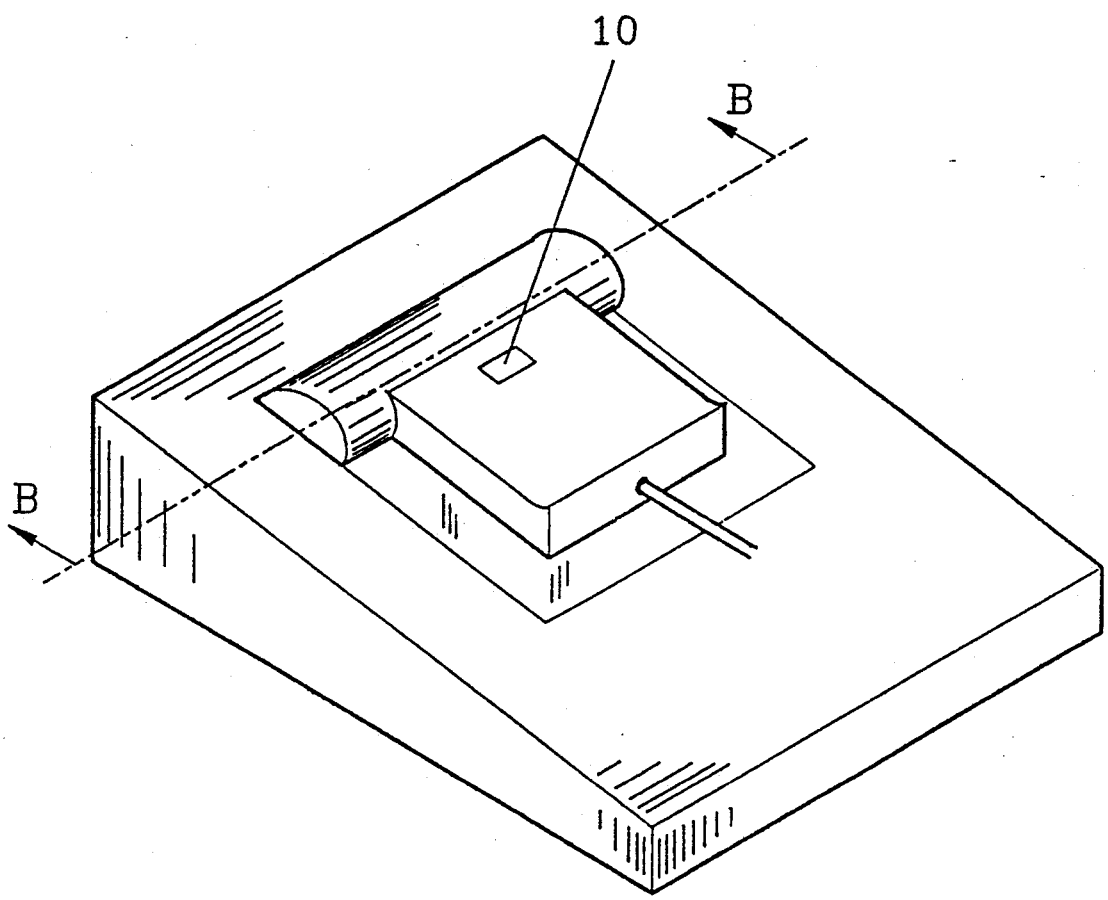
FIG. 5 is a three-dimensional diagram of an embodiment of the reflection type scanner to transparence type scanner converter of the invention when used with a hand-held scanner.
Figure 6:
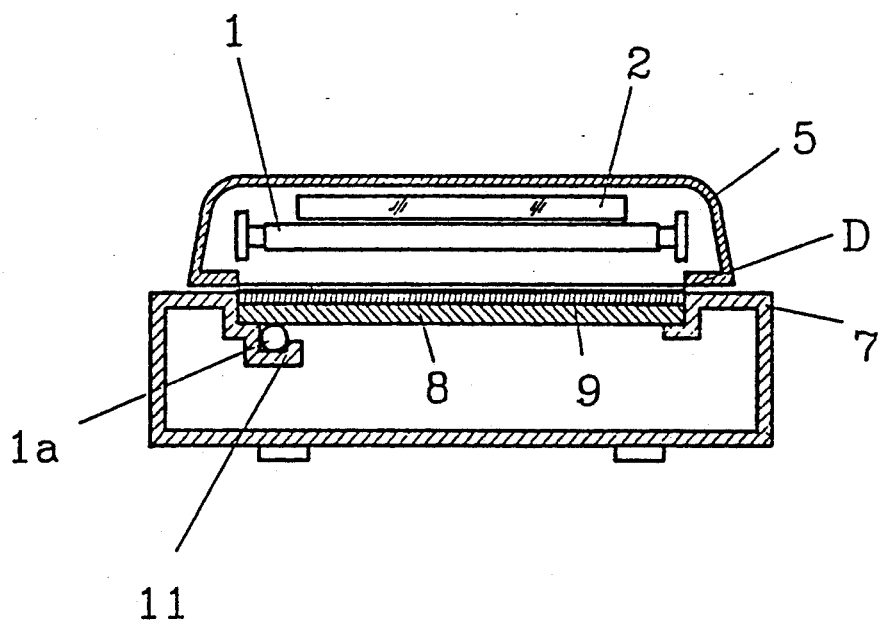
FIG. 6 is a cross section of FIG. 5 along line B—B.

FIG. 5 is a three-dimensional diagram illustrating the scanner converter of FIG. 3 as used with a hand-held scanner. FIG. 6 is a cross section of FIG. 5 along line B—B. When the user uses the scanner as a reflection type scanner, a driving means which is always a driving program drives the scanner, sets all the parameters, and turns on the lamp 1. The user then presses the start button 10 on the hand-held scanner and slides the scanner smoothly over the media to be scanned (such as a sheet of paper) so that the scanner can, in the appropriate manner, convert the image on the media into electrical signals to be input to a computer system. The operation is as that of a standard reflection type scanner.

When the user uses the scanner as a transparence type scanning, a driving means is also used to drive the scanner and turn on the lamp 1a in the converter. In this embodiment an independent control apparatus is used to turn on the lamp 1a in the converter, instead of turning on the lamp 1 of the scanner. After the light emitted from the lamp passes through the light transmitter 8, it is evenly distributed over all sectors of the light transmitter to provide the illuminant required for scanning.

The document to be scanned D is made from transparent material. The user places the document D on the upper surface of the converter scanning window (i.e. the upper surface of the light transmitter 8). Due to the relative softness of the light transmitter 8 material, during application it is preferably covered with a protective layer 9. The material selected for the protective layer may be a transparent material with a relatively hard surface, such as plastic or glass, which can protect the light transmitter layer while also allowing the unrestricted pass of light.

To ensure correct placement of the document D on the converter, especially when using small-sized slides or negatives, a media fixing apparatus (not shown) may be appended to the top of the converter to prevent the media from sliding during scanning.

During scanning with a hand-held scanner, the "start" button is pressed and the scanner is slid smoothly and evenly over the document D in order to convert the document data into electricity for input to a computer system.

Embodiments 2-4

Figure 7:
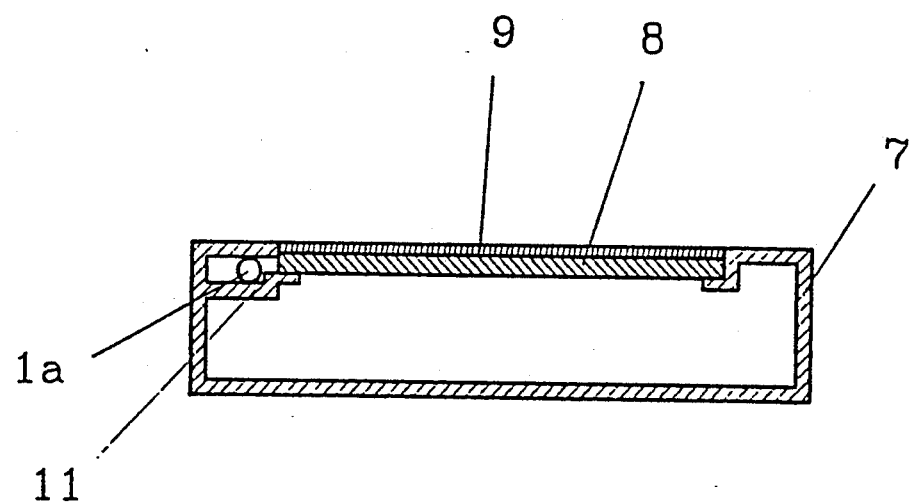
FIG. 7 is a cross section illustrating the placement of lamp in another preferred embodiment of the scanner converter of the invention.
Figure 8:
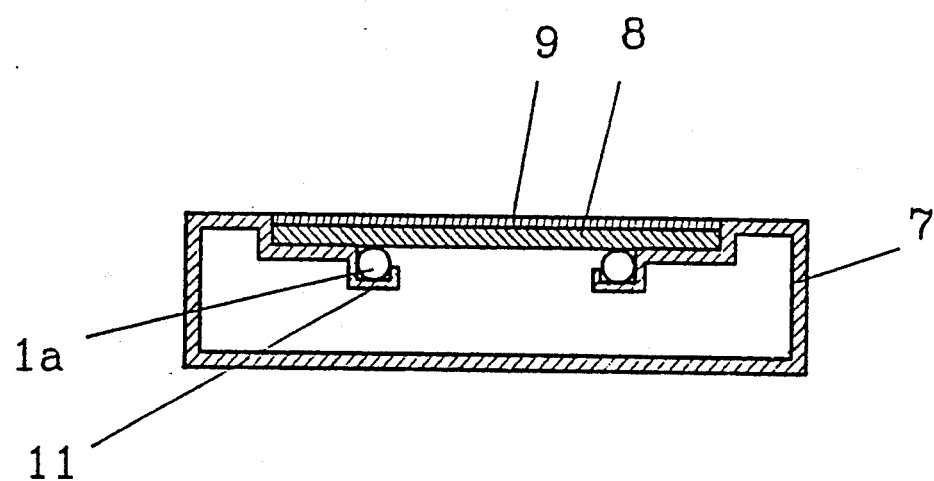
FIG. 8 is a cross section illustrating the placement of lamp in a third preferred embodiment of the scanner converter of the invention.
Figure 9:
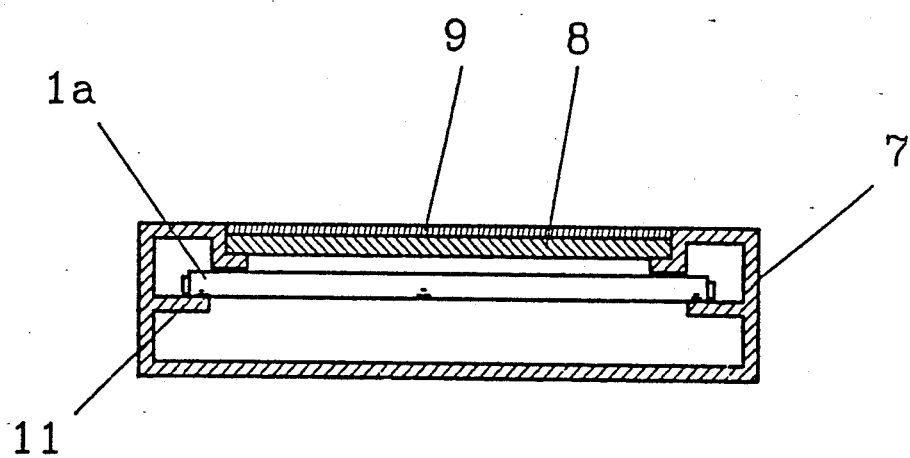
FIG. 9 is a cross section illustrating the placement of lamp in a fourth preferred embodiment of the scanner converter of the invention.

FIGS. 7 through 9 are section views of three other preferred embodiments of the invention illustrating different placement of lamp in the converter. Although the inventor considers the results provided by placing the lamp as shown in FIG. 4 to be best, placing the lamp to one side of the light transmitter as shown in FIG. 7 can help reduce the thickness of the converter; placing two or more lamps below the light transmitter 8 as shown in FIG. 8 can increase brightness and provide more even distribution of brightness over all sectors of the light transmitter 8. Placement of the lamp as shown in FIG. 9 provides similar results.

Figure 10:
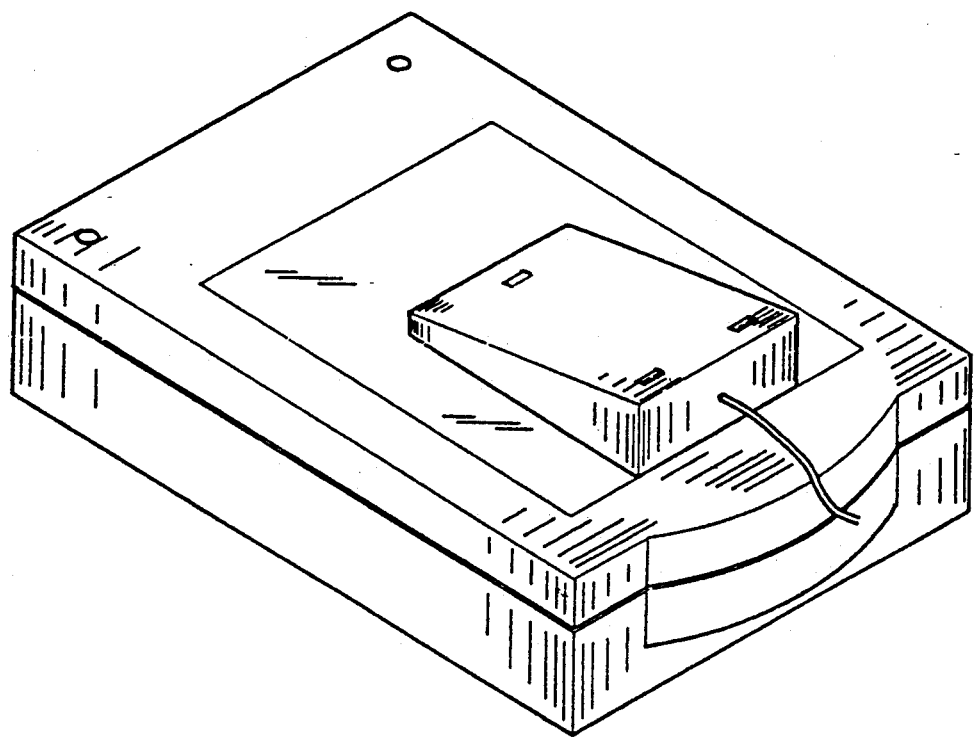
FIG. 10 is a side view illustrating the scanner converter of this invention when used with a flatbed scanner.

FIG. 10 is a side view of the scanner converter as used with a flat-bed scanner. In this configuration the converter is placed upside down on the scanning window of the flat-bed scanner. The document D to be scanned is placed between the scanner and the converter. During scanning the scanner is, as in the other configurations, first activated by the driver, and electricity supplied to the converter lamp. The light emitted by the lamp 1a then passes through the document, enters the converter, and is picked up by the image sensor. Because the document medium is transparent, during scanning the light disperses after passing through the document D without affecting scanning results, even when the lamp 1 in the scanner is activated. If software-based control is used, transparence type scanning can also be performed with the light source disabled.

As mentioned previously, the present invention provides a novel reflection type scanner to transparence type scanner converter which makes reflection type scanners capable of transparence type scanning, thereby resolving the shortcoming of standard scanners having only one type of scanning function. Use of the present invention can provide those traditional reflection type scanners readily available on the market with added the added capability of transparence type scanning, making the invention a novel creation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A reflection-transpanence scanner, comprising:
   a first casing;
   a lamp, fixed to said first casing;
   a scanning window, provided on said first casing at an opposite position to said lamp;
   a reflecting mirror, fixed to said first casing at a first reflecting position relative to said scanning window;
   a lens, fixed to said first casing at a second reflecting position relative to said reflecting mirror;
   an image sensor, fixed to said first casing at a rear position of a light path formed by said lamp to receive light beams passing through said lens;
   a scanner light supply means, comprising:
   a second casing, having a flat upper surface installed with a light emitting window opposite said scanning window;
   a light source, fixed to said second casing at an opposite position relative to said light emitting window;
   a power supply, to provide the electricity required by said light source;
   a light transmitter, fixed to said light emitting window of said second casing, and used to evenly distribute over a plane the light emitted by said light source; and
   a media fixing means, fixed to said light emitting window and used to fix a recording media to be scanned at a relatively fixed position.

* * * * *